United States Patent [19]

Kühnke et al.

[11] Patent Number: 4,546,489

[45] **Date of Patent: * Oct. 8, 1985**

[54] SINGLE TANK X-RAY DIAGNOSTIC GENERATOR

[75] Inventors: Hermann Kühnke, Muenchaurach; Manfred Rattner, Buckenhof, both of Fed. Rep. of Germany

[73] Assignee: Siemens Aktiengesellschaft, Berlin & Munich, Fed. Rep. of Germany

[ * ] Notice: The portion of the term of this patent subsequent to Aug. 23, 2000 has been disclaimed.

[21] Appl. No.: 425,278

[22] Filed: Sep. 28, 1982

[30] Foreign Application Priority Data

Nov. 11, 1981 [DE] Fed. Rep. of Germany ... 8132991[U]

[51] Int. Cl.[4] ............ G03B 41/16

[52] U.S. Cl. ............ 378/103; 378/101; 378/202

[58] Field of Search ............ 378/134, 193, 199, 200, 378/201, 202, 101, 103

[56] References Cited

U.S. PATENT DOCUMENTS 2,025,139 12/1935 Waite ............ 378/194
2,611,096 9/1952 Wright ............ 378/118
4,065,689 12/1977 Pleil ............ 378/134

FOREIGN PATENT DOCUMENTS 7935945 11/1979 Fed. Rep. of Germany .

*Primary Examiner*—Craig E. Church
*Attorney, Agent, or Firm*—Hill, Van Santen, Steadman & Simpson

[57] ABSTRACT

A single tank X-ray diagnostic generator has a double focus X-ray tube, two high voltage transformers feeding the X-ray tube, and two doubler circuits respectively connected to the secondaries of the high voltage transformers for doubling the output voltage thereof, each doubler circuit consisting of two high voltage rectifiers and two high voltage capacitors. All of the components are contained in a single oil-filled receptacle having a radiation exit window through which the X-rays are emitted. The transformers for supplying the filament voltages to the X-ray tube filaments are adjacently disposed in the receptacle at one end of the X-ray tube.

1 Claim, 3 Drawing Figures

SINGLE TANK X-RAY DIAGNOSTIC GENERATOR

BACKGROUND OF THE INVENTION

1. Field of the Invention

The present invention relates to X-ray diagnostic generators, and in particular to such generators wherein all components are contained in an oil filled receptacle.

2. Description of the Prior Art

An X-ray diagnostic generator is described in German Utility Model No. 7,935,945 corresponding to U.S. Pat. No. 4,400,822 of H. Kuehnke and M. Rattner issued on Aug. 23, 1983, in which a single focus X-ray tube, two high voltage transformers for heating the X-ray tube, and the components of two doubler circuits respectively connected to the secondaries of the high voltage transformers are all contained in a single oil-filled receptacle having a radiation exit window for the X-rays. The receptacle also contains a transformer for the filament supply voltage disposed at one end of the X-ray tube. The two high voltage transformers are also disposed adjacent to the X-ray tube and are arranged symmetrically with respect to the radiation exit window in close proximity to the receptacle wall. The rectifiers and capacitors are disposed above the X-ray tube and are also arranged symmetrically relative to the radiation exit window.

SUMMARY OF THE INVENTION

It is an object of the present invention to provide an X-ray diagnostic generator having a double focus X-ray tube wherein all components associated with the operation of the X-ray tube are arranged in a single receptacle in such a manner that the filament transformers for the double focus X-ray tube are disposed in the receptable in a space-saving manner.

The above object is inventively achieved wherein the two filaments supply transformers are adjacently arranged in the receptacle at one end of the X-ray tube. The single oil-filled receptacle also accommodates all of the other high voltage components for operating the X-ray tube.

DESCRIPTION OF THE PREFERRED EMBODIMENTS

Figure 1:
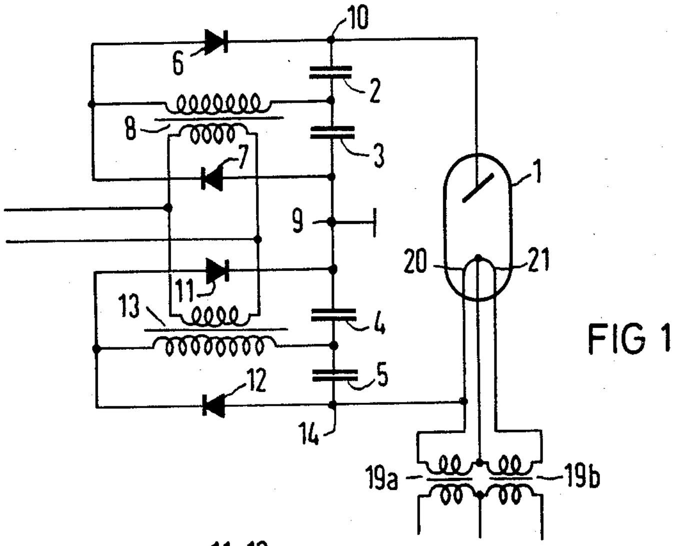
FIG. 1 is a circuit diagram of an X-ray diagnostic generator having a double focus X-ray tube.

An X-ray diagnostic generator having a double focus X-ray tube 1 is shown in FIG. 1. The double focus X-ray tube 1 is connected in series with four high voltage capacitors 2, 3, 4 and 5. A circuit node 9 between the capacitors 3 and 4 is connected to ground. The circuit also includes two high voltage rectifiers 6 and 7 which form a voltage doubler circuit in combination with the capacitors 2 and 3 for the output voltage of a high voltage transformer 8. The voltage between circuit nodes 9 and 10 is twice as great as that of the secondary voltage of the high voltage transformer 8. In the same manner, capacitors 4 and 5 in combination with high voltage rectifiers 11 and 12 form a doubler circuit for the output voltage of another high voltage transformer 13. The voltage between the circuit nodes 9 and 14 is twice as great as the secondary voltage of the high voltage transformer 13. Thus, the voltage supplied to the double focus X-ray tube 1 is four times the value of the secondary voltage of one of the high voltage transformers 8 or 13.

As also shown in FIG. 1, the double focus X-ray tube 1 has two filaments 20 and 21 which are respectively associated with the two foci of the X-ray tube. The filament 20 is heated by a filament supply transformer **19*a* and the filament 21 is heated by a filament supply transformer 19*b***.

Figure 2:
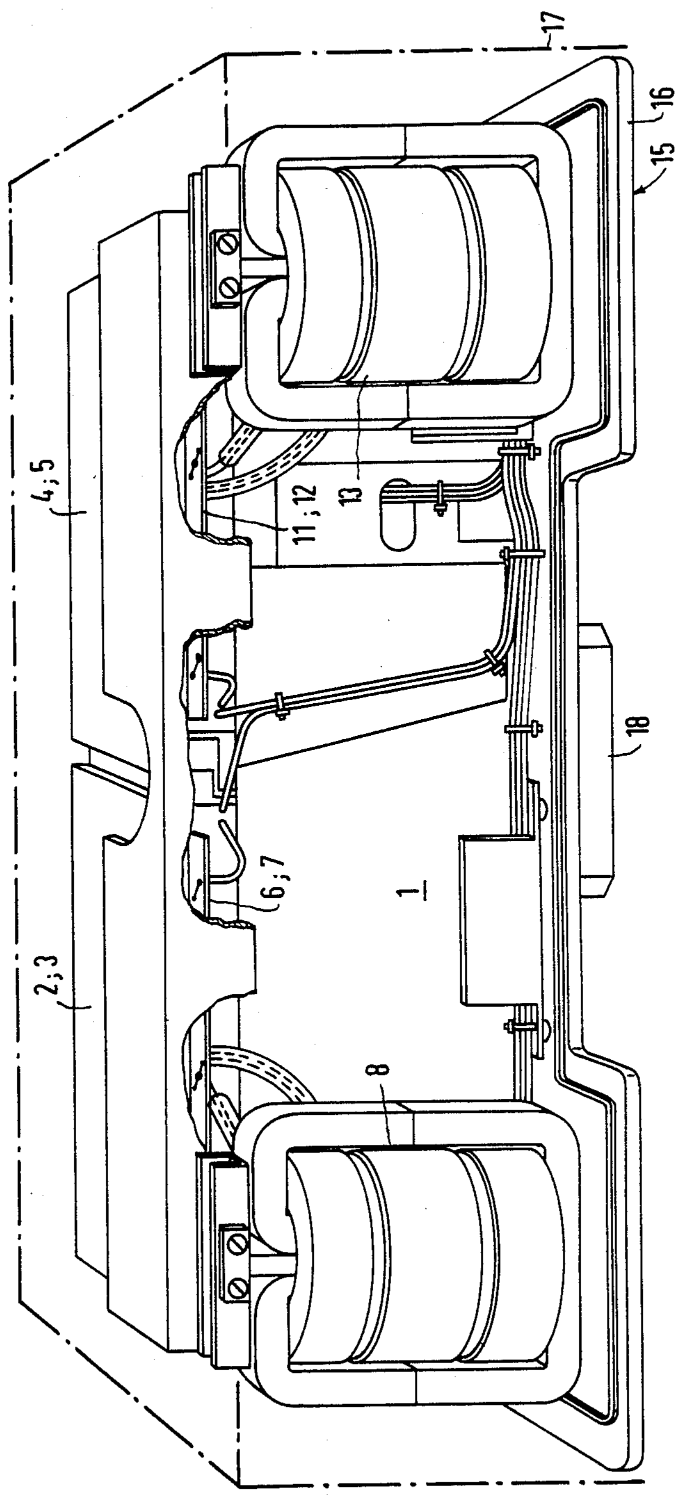
FIG. 2 is a front view of the components of an X-ray diagnostic generator of the type shown in FIG. 1 arranged in a single receptacle in accordance with the principles of the present invention.

A physical realization and arrangement of the components shown in the circuit of FIG. 1 is shown in FIG. 2 wherein all of the components are disposed within a single oil-filled receptacle 15. The receptacle 15 consists of a base plate 16 and a housing 17, shown in phantom in FIG. 2 in order to view the arrangement of the components inside the receptacle. The housing 17 is connected in fluid-tight relation to the base 16.

The double focus X-ray tube 1 emits X-rays through a radiation exit window 18. The two high voltage transformers 8 and 13 are arranged adjacent to the double focus X-ray tube 1 and are symmetrically disposed with respect to the radiation exit window 18 in close proximity to the walls of the housing 17. The high voltage rectifiers 6 and 7 and the high voltage capacitors 2 and 3 associated with the high voltage transformer 8 are disposed above the double focus X-ray tube 1 on one side of a center plane of the generator, and the high voltage rectifiers 11 and 12 and the high voltage capacitors 4 and 5 associated with the high voltage transformer 13 are disposed above the transformer 13 on the other side of the center plane of the generator. The rectifiers 6, 7, 11 and 12 are mounted on respective plates comprised of insulating material. The capacitors 2 and 3 and the capacitors 4 and 5 are disposed symmetrically with respect to the radiation exit window 18, as are the rectifiers 6 and 7 and the rectifiers 11 and 12. The rectifiers and capacitors are supported by the upper ends of the high voltage transformers 8 and 13 a distance above the base plate 16.

Figure 3:
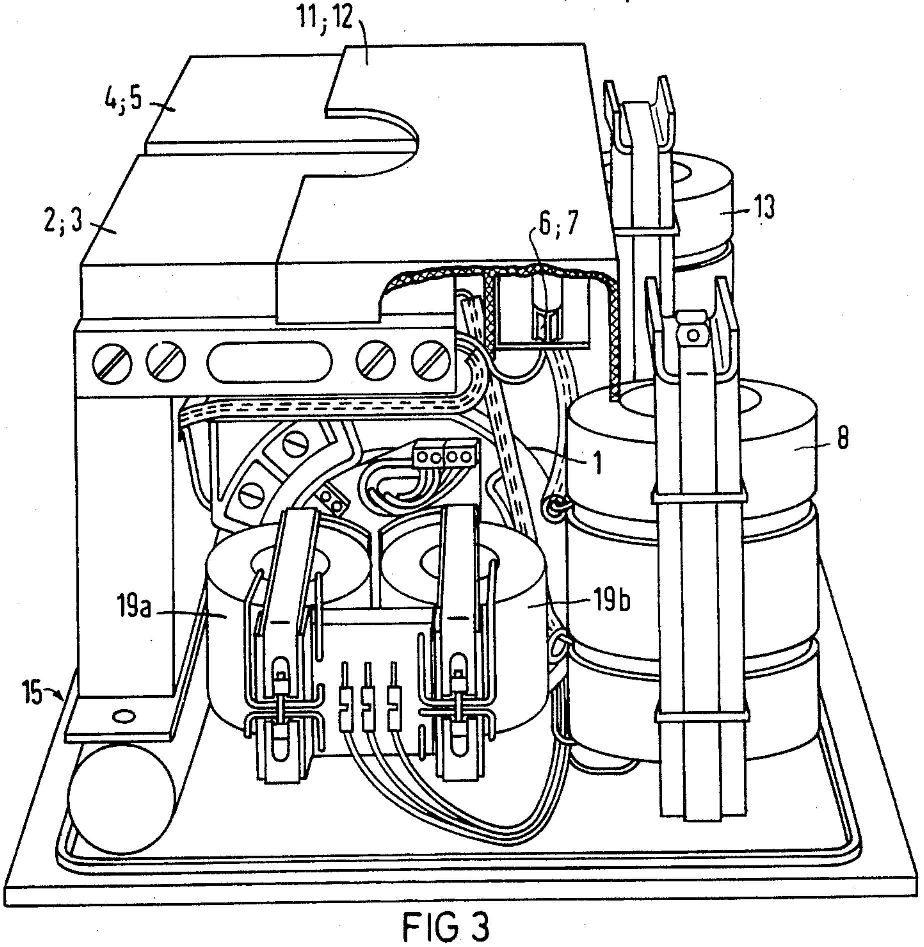
FIG. 3 is a side view of the components arranged in the receptacle shown in FIG. 2.

A side view of the generator is shown in FIG. 3 with the housing 17 removed showing the two filament supply transformers **19*a* and 19*b* for the filaments 20 and 21. The transformers 19*a* and 19*b* are disposed adjacent to one another at one end of the double focus X-ray tube 1, which is the left end with respect to FIG. 2. The high voltage transformers 8 and 13 and the filament supply transformers 19*a* and 19*b* have respective vertical axes. The high voltage transformers 8 and 13 are mounted with their vertical axes in a common vertical plane, and the filament supply transformers 19*a* and 19*b* are mounted with their vertical axes in another common vertical plane, which is substantially perpendicular to the common vertical plane of the transformers 8 and 13**.

The respective primary windings of the high voltage transformers 8 and 13 can be fed from an inverter with a frequency in the kilohertz range of between one and five kHz. The high voltage transformers 8 and 13 may thus be designed small and light-weight.

Although modifications and changes may be suggested by those skilled in the art it is the intention of the inventors to embody within the patent warranted hereon all changes and modifications which reasonably and properly come within the scope of their contribution to the art.

We claim as our invention:

1. An X-ray diagnostic generator having a plurality of components comprising a double focus X-ray tube, two high voltage transformers for feeding said X-ray tube having respective vertical axes, two double circuits respectively connected to the secondaries of said high voltage transformers, each of said doubler circuits consisting of two high voltage rectifiers and two high voltage capacitors, and two filament supply transformers connected to said double focus X-ray tube having respective vertical axes, and a single oil-filled receptacle containing all of said components having a flat base plate, said receptacle having a radiation exit window centrally disposed therein aligned on one side of said X-ray tube through which X-rays from said X-ray tube are emitted, said two high voltage transformers being mounted on said base plate in said receptacle with their vertical axes in a first common vertical plane adjacent to said X-ray tube and in symmetrical relation with respect to said radiation exit window and in close proximity to opposite end walls of said receptacle, said rectifiers and said capacitors being disposed in said receptacle above and on opposite sides of said X-ray tube in symmetrical relation to said radiation exit window and being supported by said two high voltage transformers a distance above said base plate, and said two filament transformers being disposed on said base plate adjacent to one another in said receptacle at one end of said X-ray tube with their vertical axes in a second common vertical plane substantially perpendicular to said first common vertical plane, and a removable housing mating with said base plate for enclosing and defining said oil-filled receptacle in combination with said base plate.

* * * * *